United States Patent
Okusako et al.

(10) Patent No.: US 6,730,630 B2
(45) Date of Patent: May 4, 2004

(54) PHOTOCATALYST, PROCESS FOR PRODUCING THE SAME AND PHOTOCATALYST COATING COMPOSITION COMPRISING THE SAME

(75) Inventors: Kensen Okusako, Niihama (JP); Hiroyuki Ando, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/978,800

(22) Filed: Oct. 18, 2001

(65) Prior Publication Data

US 2002/0077251 A1 Jun. 20, 2002

(30) Foreign Application Priority Data

Oct. 20, 2000 (JP) .......................................... 2000-321026
Nov. 9, 2000 (JP) .......................................... 2000-341713

(51) Int. Cl.[7] .......................... B01J 23/00; B32B 15/02; B32B 17/02; C01G 23/047
(52) U.S. Cl. ...................... 502/350; 502/308; 502/309; 502/351; 428/403; 423/610
(58) Field of Search ................. 502/350, 308, 502/309, 351; 428/403; 423/610

(56) References Cited

U.S. PATENT DOCUMENTS

| | | | |
|---|---|---|---|
| 5,011,674 A | 4/1991 | Yoshimoto et al. | 423/610 |
| 6,187,438 B1 * | 2/2001 | Chopin et al. | 428/403 |
| 6,383,980 B1 * | 5/2002 | Hagihara et al. | 502/340 |

FOREIGN PATENT DOCUMENTS

| | | |
|---|---|---|
| EP | 0 812 619 A | 12/1997 |
| EP | 0 875 289 A | 11/1998 |
| EP | 1 065 169 A1 | 1/2001 |
| EP | 1 095 908 A1 | 5/2001 |
| EP | 1 125 636 A1 | 8/2001 |
| JP | 2000-140636 | 5/2000 |

OTHER PUBLICATIONS

Shinri Sato, "Photocatalytic Activity of $NO_x$–Doped $TiO_2$ in the Visible Light Region", *Chemical Physics Letters*, vol. 123, No. 1,2, Jan. 3, 1986, pp. 126–128.

Kanezaki et al., "Solid–state Chemistry of Thermally Induced Yellow Colouring in Synthetic Hydrous Titanium Oxide from $TiCl_3$", *J. Chem. Soc. Faraday Trans.*, vol. 88, No. 24, 1992, pp. 3583–3586 (No month avail.).

Ileperuma O A et al: "Photocatalytic behavior of metal doped titanium dioxide. Studies on the photochemical synthesis of ammonia on Mg/TiO2 catalyst systems" APPLIED CATALYSIS, vol. 62, No. 1, Jun. 20, 1990, pages L1–L5, XP008017196* page L2–page L4*.

EPO Communications for Application No. EP 01 30 8838 dated Jun. 10, 2003, including attached Partial European Search Report and Lack of Unity of Invention form.

Palmisano, L., et al., "Surface Properties of Iron–Titania Photocatalysts Employed for 4–Nitrophenol Photodegradation in Aqueous $TiO_2$ Dispersion", *Catalysis Letters* (1994), vol. 24, pp. 303–315.

(List continued on next page.)

Primary Examiner—Mark L. Bell
Assistant Examiner—Patricia L Hailey
(74) Attorney, Agent, or Firm—Sughrue Mion, PLLC (57) ABSTRACT

A photocatalyst is provided, which comprises a titanium oxide and a metal-containing compound other than titanium oxide on the surface of the titanium oxide, wherein the metal-containing compound is a metal oxide having an acid site and the photocatalyst has a BET specific surface area of about 55 $m^2/g$ or larger, or wherein the metal-containing compound is a basic metal-containing compound and the photocatalyst has an anatase-crystalline structure and an anatase-crystalline size of about 10 nm or larger. The photocatalyst shows sufficiently high photocatalytic activities by irradiation of visible light.

34 Claims, 7 Drawing Sheets

OTHER PUBLICATIONS

Soria, J., et al., "Dinitrogen Photoreduction to Ammonia over Titanium Dioxide Powders Dopes with Ferric Ions", *J. Phys. Chem.* (1991), vol. 95, pp. 274–282.

Bond, G. C., et al., "Structure and Reactivity of Titania–Supported Molybdenum and Tungsten Oxides", *Catalysis Today* (1987), vol. 1, pp. 229–243.

Martin, C., et al., "Physico–chemical Properties of $WO_3$/$TiO_2$ Systems Employed for 4–nitrophenol Photodegradation in Aqueous Medium", *Catalysis Letters* (1997), vol. 49, pp. 235–243.

Anpo, M. "Photocatalysis on Titanium Oxide Catalysts: Approaches in Achieving Highly Efficient Reactions and Realizing the Use of Visible Light", *Catalysis Surveys from Japan* (1997), vol. 1, pp. 169–179.

* cited by examiner

PHOTOCATALYST, PROCESS FOR PRODUCING THE SAME AND PHOTOCATALYST COATING COMPOSITION COMPRISING THE SAME

FIELD OF THE INVENTION

The present invention relates to a photocatalyst, a process for the photocatalyst and a photocatalyst coating composition comprising the photocatalyst.

BACKGROUND OF THE INVENTION

Ultraviolet irradiation to a semiconductor generates electrons having a strong reduction activity and positive holes having a strong oxidation activity, so as to decompose a molecular species that comes in contact with the semiconductor by the oxidation-reduction activity. Such an activity is called a photocatalytic activity. By the photocatalytic activity, substances such as organic solvents are decomposed and removed. As a substance showing the photocatalytic activity, titanium oxide is attracting much attention and photocatalysts made of titanium oxide are in the market.

However, when the photocatalysts made of titanium oxide available in the present market are irradiated with visible light, the photocatalysts only shows insufficient photocatalytic activity.

SUMMARY OF THE INVENTION

The objects of the present invention are to provide a photocatalyst that shows sufficiently high photocatalytic activities by irradiation of visible light, to provide a process for producing the photocatalyst and to provide a photocatalyst coating composition comprising the photocatalyst titanium oxide.

The present inventors have studied on titanium oxide and other compounds in order to achieve such objects. As a result, the present inventors have found that the objects and other objects are achieved by a photocatalyst comprising a titanium oxide and a metal-containing compound other than titanium oxide on the surface of the titanium oxide, and have completed the present invention.

Thus, the present invention provides a photocatalyst comprising a titanium oxide and a metal-containing compound other than titanium oxide on the surface of the titanium oxide, wherein the metal-containing compound is a metal oxide having an acid site and the photocatalyst has a BET specific surface area of about 55 m$^2$/g or larger, or wherein the metal-containing compound is a basic metal-containing compound and the photocatalyst has an anatase-crystalline structure and an anatase-crystalline size of about 10 nm or larger.

The present invention also provides a process for producing the above-described photocatalyst, for example, which comprises the steps of allowing a titanium oxide to come in contact with a solution or slurry of a metal-containing compound other than titanium oxide and/or a solution or slurry of a compound which makes the metal-containing compound by heating; and heating the resulting titanium oxide to obtain a photocatalyst.

The present invention further provides a photocatalyst coating composition comprising the above-described photocatalyst and a solvent.

DETAILED DESCRIPTION OF THE INVENTION

A photocatalyst of the present invention comprises a titanium oxide and a metal-containing compound other than titanium oxide, and the metal-containing compound is placed on the surface of the titanium oxide. The titanium oxide utilized in the present invention usually may have a chemical formula of TiO$_2$ and preferably has an anatase-crystalline structure. The titanium oxide may have any shape such as a particulate shape, a fibrous shape and a thin-layer shape.

The titanium oxide utilized in the present invention may be obtained by a process which comprises the steps of reacting a titanium compound (such as titanium oxysulfate, titanium sulfate, titanium oxychloride and titanium chloride) in an aqueous solution thereof with a base to obtain a reaction product; and calcining the reaction product. Examples of the base utilized in the reaction include ammonia, an amine and the like. The amount of the base used in the reaction may be about 1.2 times or more, and is preferably about 2 times or more, as much as the stoichiometric amount necessary to convert the titanium compound to a titanium hydroxide. Also, the amount of the base may be about 20 times or less, and is preferably about 10 times or less, as much as the stoichiometric amount. The reaction temperature may be about 60° C. or lower, and is preferably about 40° C. or lower. The calcination temperature may be about 300° C. or higher, and is preferably about 350° C. or higher. Also, the calcination temperature may be about 600° C. or lower, and is preferably about 500° C. or lower.

Alternatively, the titanium oxide utilized in the present invention may be obtained by a process in which titanium oxysulfate is calcined in the presence of oxygen, without being reacted with a base.

The photocatalyst of the present invention has a metal-containing compound (other than titanium oxide) on the surface of titanium oxide. The metal-containing compound may be a metal oxide having an acid site or a basic metal-containing compound.

The metal oxide having an acid site has at least one site selected from a Brønsted acid site and a Lewis acid site. The metal oxide may be a single-metal oxide having one metal element, a double-metal oxide having two metal elements, or a complex-metal oxide having three or more metal elements. Examples of the single-metal oxide having an acid site include an oxide of metal such as zirconium, hafnium, vanadium, niobium, tantalum, molybdenum, tungsten, manganese, iron, cobalt, nickel, cupper, aluminum, gallium, indium, tin or the like. Examples of the double-metal oxide having an acid site include an complex oxide of two metals such as silicon and zinc, silicon and zirconium, silicon and magnesium, silicon and calcium, silicon and gallium, silicon and aluminum, silicon and lanthanum, silicon and titanium, titanium and zinc, titanium and cupper, titanium and aluminum, titanium and zirconium, titanium and lead, titanium and bismuth, titanium and iron, zinc and magnesium, zinc and aluminum, zinc and zirconium, zinc and lead, zinc and antimony or the like. Preferably, The metal oxide having an acid site has at least one site selected from a Brønsted acid site and a Lewis acid site. The metal oxide may be a single-metal oxide having one metal element, a double-metal oxide having two metal elements, or a complex-metal oxide having three or more metal elements. Examples of the single-metal oxide having an acid site include an oxide of metal such as zirconium, hafnium, vanadium, niobium, tantalum, molybdenum, tungsten, manganese, iron, cobalt, nickel, copper, aluminum, gallium, indium, tin or the like. Examples of the double-metal oxide having an acid site include an complex oxide of two metals such as silicon and zinc, silicon and zirconium, silicon and magnesium, silicon and calcium, silicon and gallium, silicon and aluminum, silicon and lanthanum, silicon and titanium, titanium and zinc, titanium and copper, titanium and aluminum, titanium and zirconium, titanium and lead, titanium and bismuth, titanium and iron, zinc and magnesium, zinc and aluminum, zinc and zirconium, zinc and lead, zinc and antimony or the like. Preferably, the metal oxide having an acid site is a single-metal oxide of zirconium, vanadium, niobium, tantalum, molybdenum, tungsten, manganese, iron, cobalt, nickel, copper, aluminum or tin. An acid site may be called an acid center, of which amount may be measured quantitatively by an adsorption amount of an evaporated base or a base in a solution thereof. Also, it is possible to measure an acid strength and a number of the acid site having the acid strength, utilizing the color change of indicators having a variety of pKa values.

The basic metal-containing compound which may be contained in the photocatalyst of the present invention has at least one site selected from a Brønsted base site and a Lewis base site. The basic metal-containing compound may be an oxide, hydroxide, carbonate or the like, of metal such as alkali metal, alkaline-earth metal, rare earth element or zinc. Examples of the metal oxide include sodium oxide, potassium oxide, magnesium oxide, calcium oxide, barium oxide, lanthanum oxide, cerium oxide, zinc oxide and the like. Examples of the metal hydroxide include sodium hydroxide, potassium hydroxide, magnesium hydroxide, calcium hydroxide, bariumhydroxide, lanthanumhydroxide, ceriumhydroxide, zinc hydroxide oxide and the like. Examples of the metal carbonate include sodium carbonate, potassium carbonate, magnesium carbonate, calcium carbonate, barium carbonate, lanthanum carbonate, cerium carbonate, zinc carbonate and the like.

The photocatalyst of the present invention may have, on the surface of titanium oxide, any one (or two or more) of the above-described metal oxides having an acid site or the above-described basic metal-containing compounds.

In the photocatalyst of the present invention, the metal-containing compound (such as a metal oxide having an acid site and a basic metal-containing compound) may cover all of the surface or a potion of the surface of the titanium oxide in the photocatalyst. When the portion of the surface of the titanium oxide is covered with the metal-containing compound, the metal-containing compound may discontinuously exist in a dot-like shape, or may continuously exist in a line thereof or in a lattice thereof, on the surface of the titanium oxide. The amount of the metal-containing compound in the photocatalyst may be about 0.05% by mole or more, and is preferably about 0.1% by mole or more, in terms of the metal element of the compound, based on titanium in the photocatalyst. Also, the amount of the metal-containing compound may be about 50% by mole or less, and is preferably about 30% by mole or less, and is more preferably about 10% by mole or less, in terms of the metal element of the compound, based on titanium in the photocatalyst. When the amount of the metal-containing compound exceeds the appropriate amount, the catalytic activity of the photocatalyst tends to be lowered.

The photocatalyst of the present invention which comprises a titanium oxide and a metal oxide having an acid site on the surface of the titanium oxide is able to decompose a substance such as a basic compound, an oxygen-containing compound, a sulfur-containing compound and the like. Also, the photocatalyst of the present invention which comprises a titanium oxide and a basic metal-containing compound on the surface of the titanium oxide is able to decompose a substance such as an acidic substance such as a hydrogen sulfide, isobutyric acid, acetic acid and the like. It is not always clear why the photocatalyst of the present invention shows such a high catalytic activity by radiation with visible light, to decompose such a substrate around the photocatalyst. It seems that the substance may selectively be adsorbed onto the acid site or basic site of the photocatalyst, and then maybe effectively decomposed by electrons and positive holes, which are generated in the photocatalyst by radiation with visible light.

It is noted that a basic compound tends to be adsorbed selectively onto the Brønsted acid site, and an oxygen-containing compound and a sulfur compound tend to be adsorbed selectively onto the Lewis acid site. Therefore, the decomposition may be effectively conducted, depending on the substrate to be decomposed, by adjusting the amount of the Brønsted acid site and/or the Lewis acid site in the photocatalyst or the ratio of the Brønsted acid site to the Lewis acid site (if both sites are in the metal oxide). On the other hand, the kind and the amount of acid sites in the photocatalyst may be controlled by adjusting the kind and the amount of the above-described metal oxide in the photocatalyst.

In the present invention, the photocatalyst comprising a metal oxide having an acid site preferably has a BET specific surface area of about 55 $m^2/g$ or larger. The BET specific surface area may be measured in a nitrogen adsorption method. When the photocatalyst has a BET specific surface area of smaller than about 55 $m^2/g$, the catalytic activity of the photocatalyst tends to be lowered, even if the photocatalyst comprises a metal oxide having an acid site. The larger the BET specific surface area of the photocatalyst is, the higher catalytic activity of the photocatalyst may become. On the other hand, when the BET specific surface area of the photocatalyst is too large, it may be difficult to disperse the photocatalyst in a solvent to prepare a photocatalyst coating composition thereof. The BET specific surface area of the photocatalyst may be about 300 $m^2/g$ or smaller, and is preferably about 250 m²/g or smaller, and is more preferably about 200 m²/g or smaller.

In the present invention, the photocatalyst comprising a basic metal-containing compound preferably has an anatase-crystalline structure and an anatase-crystalline size of about 10 nm or larger. The anatase-crystalline structure may be observed with X-ray diffraction (hereinafter, referred to as XRD). The anatase-crystalline size (L) may be calculated by the following equation:

$$L(nm) = K \cdot \lambda / (\beta \cdot \cos\theta)$$

(wherein K represents Scherrer constant (=0.94), $\lambda$(nm) represents a wavelength of X-ray to be used for XRD, $\beta$ (radian) represents a half-width of the peak corresponding to (101) plate in XRD spectrum of the photocatalyst, and $\theta$(radian) represents a half of diffraction angle ($2\theta$) corresponding to the peak.) It is noted that an anatase crystal of titanium oxide has a peak corresponding to (101) plate at a diffraction angle ($2\theta$) of about 25° in its XRD spectrum. When the photocatalyst has an anatase-crystalline size of smaller than about 10 nm, the catalytic activity of the photocatalyst tends to be lowered, even if the photocatalyst comprises a basic metal-containing compound. The larger the anatase-crystalline size is, the higher catalytic activity of the photocatalyst may become. The anatase-crystalline size is preferably about 13 nm or larger.

The photocatalyst of the present invention may have index X of about 0.2 or more, and preferably has index X of about 0.25 or more, index X being calculated by equation (I):

$$X = B/A \quad (I)$$

wherein A represents an integrated value of absorbance within a wavelength range of from 220 nm to 800 nm along an ultraviolet-visible diffuse reflection spectrum of the photocatalyst, and B represents an integrated value of absorbance within a wavelength range of from 400 nm to 800 nm along the ultraviolet-visible diffuse reflection spectrum. Each of these integrated values, A and B, of absorbance corresponds to an integrated area below the ultraviolet-visible diffuse reflection spectrum of the photocatalyst within the above-designated respective wavelength ranges, the spectrum plotting absorbance in ordinate and wavelength in abscissa.

In the present invention, the photocatalyst comprising a metal oxide having an acid site on the surface of titanium oxide preferably has index Y of about 0.05 or more, and more preferably has index Y of about 0.08 or more, index Y being calculated by equation (II):

$$Y = (C-D)/C \quad (II)$$

wherein C and D represent half-widths of peaks within the range of binding energy of from 458 eV to 460 eV in the second and forth X-ray photoelectron spectra, respectively, the spectra being the second and fourth spectra among the four-time measurements of X-ray photoelectron spectrum showing an electric state of titanium of the photocatalyst in irradiating with X-rays.

On the other hand, the photocatalyst in the present invention which comprises a basic metal-containing compound on the surface of titanium oxide preferably has index Z of about 0.8 and more, which is calculated by equation (III):

$$Z = F/E \quad (III)$$

wherein E represents a BET specific surface area (m²/g) of the photocatalyst and F represents a $CO_2$ adsorption amount ($\mu$mol/g) of the photocatalyst. The $CO_2$ adsorption amount is usually in proportion to the number of the basic site on the surface of the photocatalyst and, therefore, a large $CO_2$ adsorption amount of photocatalyst means that the photocatalyst has a lot of basic sites. Also, the large index Z of photocatalyst means that the photocatalyst has a lot of basic site per unit surface area of the photocatalyst, i.e., high density of basic site. The $CO_2$ adsorption amount may be measured by a method ($CO_2$ adsorption-heating-remove method) in which the photocatalyst to be measured is placed in a sealed container degassed in vacuum, carbon dioxide is supplied therein to make the photocatalyst adsorb the carbon dioxide, the resulting photocatalyst is removed from the container, and the adsorbed carbon dioxide is removed from the photocatalyst by heating in a gas flow (such as helium flow) having no carbon dioxide, to measure the amount of the removed carbon dioxide.

The photocatalyst in the present invention may be produced in a method (impregnation method), which comprises the steps of allowing a titanium oxide to come in contact with a solution or slurry of a metal-containing compound (such as a metal oxide and a basic metal-containing compound) other than titanium oxide and/or a solution or slurry of a compound which can make the metal-containing compound by heating; and heating the resulting titanium oxide to obtain a photocatalyst. Alternatively, the photocatalyst in the present invention may be produced in another method (adsorption method), which comprises the steps of putting in a sealed-container having an oxygen partial pressure of from about 5 mmHg to about 120 mmHg (preferably, from about 20 mmHg to about 100 mmHg), a titanium oxide and at least one compound selected from the group consisting of a metal-containing compound (such as a metal oxide and a basic metal-containing compound) and a compound which can make the metal-containing compound by heating; heating and evaporating the compound so that the compound adheres to the surface of the titanium oxide.

In the impregnation method, for obtaining the photocatalyst comprising a metal oxide having an acid site on the surface of titanium oxide, may be utilized a solution or slurry of a metal-containing compound such as a metal oxide (other than titanium oxide) as well as a solution or slurry of a compound which can make the metal-containing compound by heating. Examples of the compound which can make the metal-containing compound by heating may be a compound that can make the metal oxide having an acid site by heating, and include ammonium salts, sulfates, carbonates, chlorides, salts of organic acids, hydroxides and alkoxides, of the corresponding metal acids.

In the impregnation method, on the other hand, for obtaining the photocatalyst comprising a basic metal-containing compound on the surface of titanium oxide, may be utilized a solution or slurry of a metal-containing compound such as a basic metal-containing compound as well as a solution or slurry of a compound which can make the metal-containing compound by heating. Examples of the metal-containing compound such as the basic metal-containing compound include oxides, hydroxides, carbonates, of a metal such as an alkali metal, an alkaline-earth metal, a rare-earth metal, zinc or the like. Examples of the compound which can make the basic metal-containing compound by heating may be a compound that make the basic metal oxide by heating, and include ammonium salts, sulfates, chlorides, salts of organic acids, and alkoxides, of the corresponding basic metal.

The impregnation method may be conducted at a temperature of form about 200° C. or higher, and is preferably conducted at a temperature of form about 250° C. or higher. Also, the impregnation method may be conducted at a temperature of form about 600° C. or lower, and is preferably conducted at a temperature of form about 500° C. or lower.

Furthermore, the photocatalyst in the present invention may be produced by a method in which a metal-containing compound is placed on a titanium oxide, for example, by the impregnation method or by the adsorption method, and then the resulting titanium oxide having the metal-containing compound thereon is treated with steam, carbon dioxide gas or the like, to obtain a photocatalyst. Specifically, a photocatalyst having a basic metal-containing compound on a titanium oxide in the present invention may be produced by a method in which a basic metal oxide is placed on a titanium oxide by the impregnation method or by the adsorption method, and then the resulting titanium oxide having the metal oxide thereon is treated with steam to obtain the photocatalyst. Also, a photocatalyst having a basic metal carbonate on a titanium oxide in the present invention may be produced by a method in which a basic metal oxide is placed on a titanium oxide by the impregnation method or by the adsorption method, and then the resulting titanium oxide having the basic metal oxide thereon is treated with carbon dioxide to obtain the photocatalyst.

The photocatalyst thus obtained in the present invention may have any shape. The photocatalyst having a particulate shape may be molded to have a shape of pellet, fiber, film or the like, using a polymer resin, a binding agent, a molding agent, an antistatic agent, an adsorption agent or the like, if necessary.

When the photocatalyst of the present invention is utilized, the photocatalyst may be put in a visible-light-transmitting glass tube or container together with a material to be treated, and then be irradiated with visible light having a wavelength of about 430 nm or more using a light source. Irradiation time of light may be determined depending on light intensity of the light source, and the kind and amount of the material to be treated. In the irradiation with visible light to the photocatalyst, the material treated with the photocatalyst may be oxidized or reduced to be decomposed. The light source is not particularly limited as long as it can emit visible light having a wavelength of about 430 nm or more. Example of the light source include solar rays, a fluorescent lamp, a halogen lamp, a black light, a xenon lamp, a mercury arc lamp and a sodium lamp. The light source may be equipped with an ultraviolet-cutting filter and/or an infrared-cutting filter, if necessary.

A photocatalyst coating composition in the present invention comprises the above-described photocatalyst and a solvent. The photocatalyst coating composition makes it possible to easily apply the photocatalyst onto various materials such as a construction material and an automobile material and to coat such various materials with the photocatalyst, so as to impart high photocatalytic activity into such various materials. Thus obtained construction material and an automobile material, which have the photocatalyst coating composition in the present invention thereon, can effectively decompose various organic compounds such as NOx in air, organic agents, pesticides or surfactants in water, or malodorous substances (such as cigarette smell, hydrogen sulfide and isobutyric acid) and can effectively inhibit the proliferation of bacteria (such as ray fungi), algae and mould. A preferable solvent to be contained in the photocatalyst coating composition is a solvent which does not dissolve the metal-containing compound on titanium oxide, and which evaporates and does not remain with the photocatalyst after the applying or coating of the composition. Examples of the solvent include water, hydrochloric acid, alcohols and ketones. The photocatalyst coating composition may be produced, for example, by a method in which the above-described photocatalyst is dispersed in a solvent such as water, an alcohol and a ketone to obtain a slurry thereof or a method in which the above-described photocatalyst is peptized with an acid such as a diluted hydrochloric acid. Upon dispersion, a dispersing agent may be added to the photocatalyst, if necessary.

As described above, the photocatalyst in the present invention shows a high photocatalystic activity. For example, the photocatalyst comprising a metal oxide having an acid site on the surface of titanium oxide can effectively decompose various organic compounds such as aldehydes (ex. acetaldehyde. The photocatalyst comprising a basic metal-containing compound on the surface of titanium oxide can effectively decompose various organic compounds such as acid compounds, for example, carboxylic acid (ex. acetic acid and isobutyric acid), hydrogen sulfide and the like. The photocatalyst coating composition in the present invention makes it possible to easily apply the photocatalyst onto various materials such as a construction material and an automobile material and to coat such various materials with the photocatalyst, so as to impart a high photocatalytic activity into such various materials. In accordance with the processes in the present invention, the photocatalyst and the photocatalyst coating composition can be easily produced.

The photocatalyst, the photocatalyst coating composition comprising the photocatalyst and the processes for producing them in the present invention are described in Japanese application nos. 2000-321026, filed Oct. 20, 2000 and/or 2000-341713, filed Nov. 9, 2000, the complete disclosures of which are incorporated herein by reference.

The invention being thus described, it will be apparent that the same may be varied in many ways. Such variations are to be regarded as within the spirit and scope of the invention, and all such modifications as would be apparent to one skilled in the art are intended to be within the scope of the following claims.

EXAMPLES

The present invention is described in more detail by following Examples, which should not be construed as a limitation upon the scope of the present invention.

A BET specific surface area, indexes X, Y and Z, and an anatase-crystalline size of sample photocatalyst were measured, and photocatalytic activity of sample photocatalyst was evaluated as follows:

(1) BET Specific Surface Area

ABET specific surface area ($m^2/g$) is measured in a nitrogen adsorption method.

(2) Index X:

An ultraviolet-visible diffuse reflection spectrum of sample photocatalyst was obtained using barium sulfate as a standard white board with an ultraviolet and visible spectrophotometer (trade name: UV-2500PC, manufactured by Shimadzu Corporation). An integrated value A of absorbance (within a wavelength range of from 220 nm to 800 nm) and an integrated value B of absorbance (within a wavelength range of from 400 nm to 800 nm), each of which is along the ultraviolet-visible diffuse reflection spectrum, were obtained. Using the integrated values, A and B, index X was calculated by equation (I):

$$X=B/A \qquad (I)$$

(3) Index Y

X-ray photoelectron spectrophotometry (XPS) spectra of sample photocatalyst, which show an electron state of titanium, were obtained fourth times (together with the XPS spectra showing an electron state of oxygen or carbon) using an X-ray photoelectron spectrophotometer (trade name: XPS-7000, manufactured by RIGAKU CORPORATION) and a X-ray source of M g Kα under a condition in that an out put is 8 kV and 30 mA, a scan mode is narrow scan, a pass E is 10 eV, and a step E is 0.04 eV. Specifically, an XPS spectrum showing an electron state (Ti: 2p 2/3) of titanium was measured twice (1st and 2nd measurements) for 60 seconds in each measurement; then an XPS spectrum showing an electron state (O : 1s) of oxygen was measured twice for 47 seconds in each measurement; then an XPS spectrum showing an electron state (C: 1s) of carbon was measured twice for 47 seconds in each measurement; then again an XPS spectrum showing an electron state of titanium was measured twice (3rd and 4th measurements) for 60 seconds in each measurement; then an XPS spectrum showing an electron state of oxygen was measured twice for 47 seconds in each measurement; and then an XPS spectrum showing an electron state of carbon was measured twice for 47 seconds in each measurement. Half-widths of peaks, C and D, were obtained in a range of a binding energy of from 458 eV to 460 eV of the second and forth XPS spectra showing the electron state of titanium, respectively. Using the half-widths of peaks, C and D, index Y was calculated by equation (II):

$$Y=(C-D)/C \qquad (II)$$

During the measurements of the above XPS spectra including intervals between the measurements, the sample photocatalyst was not exposed in air.

(4) Anatase-crystalline Size

After crushing a sample photocatalyst with a mortar, an X-ray diffraction (XRD) spectrum of the sample photocatalyst was measured using an X-ray diffratometer (trade name; RAD-IIA, manufactured by RIGAKU CORPORATION), to obtain a half-width, β (radian), of the peak corresponding to (101) plate of the photocatalyst in the XRD spectrum and a diffraction angle, 2θ(radian), of the peak. Using the half-width β and the diffraction angle 2 θ, an anatase-crystalline size (L) was calculated by the following equation:

$$L(nm) K \cdot \lambda / (\beta \cdot \cos\theta)$$

wherein K represents Scherrer constant, λ(nm) represents a wavelength of X-ray to be used for XRD. It is noted that C u Kα has a wavelength of 15406 nm.

(5) Index Z

A sample photocatalyst was put in a sealed container. Using a heating-degassing apparatus (manufactured by Ohkurariken Co., Ltd.), the container was degassed. The sample photocatalyst in the container was then maintained in the presence of carbon dioxide having a pressure of 13300 Pa at 100° C. for 30 minutes, so that the photocatalyst adsorbed carbon dioxide. After exhausting carbon dioxide from the container at 100° C. for 30 minutes, a helium gas was introduced into the container at a rate of 20 ml/min while heating from 100° C. to 800° C. at a rising temperature rate of 10° C./min, to collect a gas which was discharged from the container in heating. Using aquadrupole mass spectroscopy, a material having a ratio (m/e) of mass number (m) to electric charge (e) of 44 was detected in the discharged gas, to measure the amount of the material. The amount of the material are considered to be the amount of carbon dioxide which was adsorbed onto the photocatalyst. Using the adsorption amount, F (μmol/g), of carbon dioxide and the above-described BET specific surface area, E (m²/g), which was measured in the nitrogen adsorption method, index Z was calculated by equation (III):

$$Z=F/E \qquad (III)$$

(6) Photocatalytic activity

In a sealed-type glass reaction vessel (diameter: 8 cm, height: 10 cm, volume: about 0.5 L), was placed a 5-cm diameter glass Petri dish on which 0.3 g of a sample photocatalyst. The reaction vessel was filled with a mixed gas having an oxygen content of 20% by volume and a nitrogen content of 80% by volume, was sealed with a substrate in the designated amount, i.e., 13.4 μmol of acetaldehyde for evaluating photocatalytic activity of a photocatalyst comprising a metal oxide having an acid site on the surface of titanium oxide, or 4.46 μmol of acetic acid for evaluating photocatalytic activity of a photocatalyst comprising a basic metal-containing compound on the surface of titanium oxide. The reaction vessel was then irradiated with visible light from outside of the vessel. The visible light irradiation was carried out using a light source device (manufactured by USHIO INC., trade name: Optical Modulex SX-UI500XQ) which is equipped with a 500 W xenon lamp (manufactured by USHIO INC., trade name: Lamp UXL-500SX), an ultraviolet cutting filter (manufactured by Asahi Techno Glass Co., Ltd., trade name: Y-45) cutting off ultraviolet light having a wavelength of about 430 nm or shorter and an infrared light cutting filter (manufactured by USHIO INC., trade name: Supercold Filter) cutting off infrared light having a wavelength of about 830 nm or longer. When the substrate (such as acetaldehyde and acetic acid) is decomposed with the photocatalytic activity of the photocatalyst in irradiation with visible light, carbon dioxide is generated as the decomposition product of the substrate and, therefore, the photocatalytic activity of the photocatalyst was evaluated by measuring a concentration of the carbon dioxide. The carbon dioxide concentration was measured over time using a photoacoustic multigas monitor (Model: 1312, manufactured by INNOVA), to obtain a rate of producing carbon dioxide and evaluate photocatalytic activity of the photocatalyst with the rate.

Example 1

Preparation of Titanium Oxide

A titanium oxysulfate (90 g) (manufactured by Soekawa Chemical Co., Ltd.) was dissolved in water (360 g) while stirring. Into the resulting solution, was added a 25% ammonia water (104 g) (1st grade, manufactured by Wako Pure Chemical Industries, Ltd.) at an adding rate of 5 ml/min, while cooling with ice and stirring at 200 rpm, to conduct hydrolysis of titanium oxysulfate and obtain a slurry containing a titanium hydroxide. The amount of the utilized ammonia water was two times as much as the stoichiometric amount necessary to convert the titanium oxysulfate to the titanium hydroxide. The obtained slurry was filtered to collect the solid therein. The solid was washed with hot water, and was dried to obtain a powder. The powder was then calcined at 390° C. in air for one hour, followed by cooling to a room temperature. As a result, a particulate titanium oxide (having an anatase-crystalline structure and having a water content of 15% by weight) was prepared.

Coating with Metal-Containing Compound

Ammonium paratungstate pentahydrate (($NH_4$)$_{10}$$W_{12}$$O_{41}$·$5H_2O$, manufactured by Wako Pure Chemical Industries, Ltd.) was dissolved in water to prepare an aqueous solution of ammonium paratungstate having a content of 1% by weight in terms of tungsten. The aqueous solution of ammonium paratungstate (17.6 g) was added to water (100 g). Into the resulting solution, the above-obtained particulate titanium oxide (3 g) having an anatase-crystalline structure was added, and was stirred for 20 minutes under normal pressure at a normal temperature, to obtain a mixture of titanium oxide. While stirring and reducing pressure, the mixture was dried at 50° C. and then was calcined in air at 390° C. for one hour, to obtain a photocatalyst having an anatase-crystalline structure. The photocatalyst had the titanium oxide on which tungsten oxide was placed in the content of 3% by mol in terms of tungsten, based on titanium in the titanium oxide. The photocatalyst had a BET specific surface area of 65 $m^2$/g.

Figure 1:
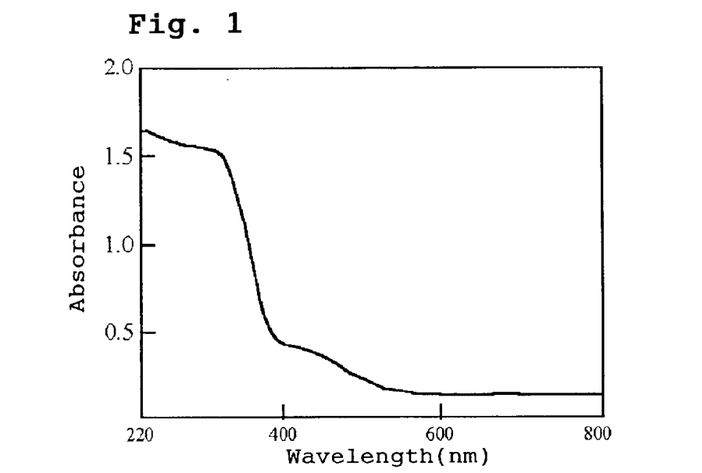
FIG. 1, 4, 10 and 13 are ultraviolet-visible diffuse reflection spectra of photocatalysts of the present invention, which are obtained in Examples 1, 2, 4 and 5, respectively.

The ultraviolet-visible diffuse reflection spectrum of the photocatalyst was obtained and is shown in FIG. 1. In Table 1, are shown integrated value A of absorbance within a wavelength range of from 220 nm to 800 nm in the spectrum; integrated value B of absorbance within a wavelength range of from 400 nm to 800 nm in the spectrum; and index X.

Figure 2:
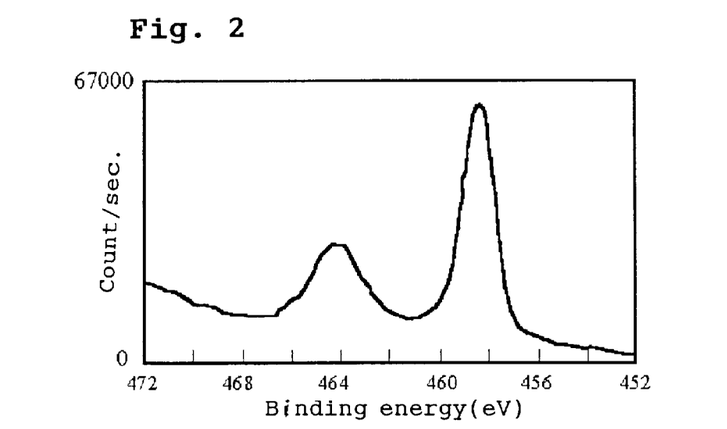
FIGS. 2 and 5 are the secondly obtained X-ray photoelectron spectra of the photocatalyst of the present invention, which are obtained in Examples 1 and 2, respectively.
Figure 3:
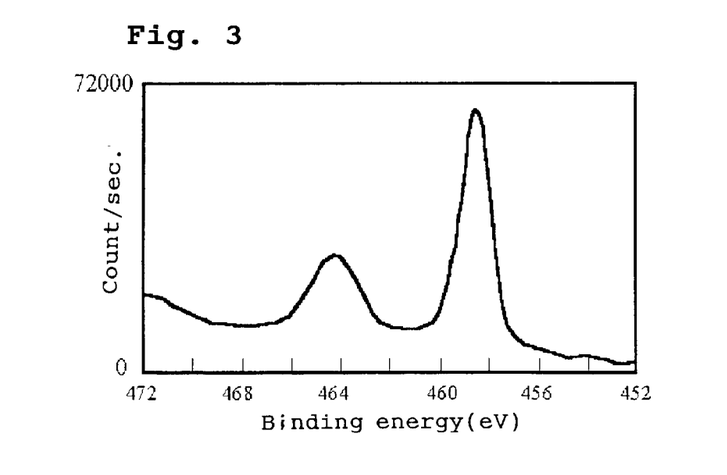
FIGS. 3 and 6 are the fourthly obtained X-ray photoelectron spectra of the photocatalyst of the present invention, which are obtained in Examples 1 and 2, respectively.

The XPS spectra of the photocatalyst were obtained (as described above in "(3) Index Y") and the second and forth XPS spectra are shown in FIG. 2 and FIG. 3, respectively. In Table 2, are shown half-widths, C and D, of peaks within a binding energy range of from 458 eV to 460 eV in the second and forth XPS spectra, respectively, and index Y.

The photocatalytic activity of the photocatalyst against acetaldehyde was evaluated. As a result, the producing rate of carbon dioxide was 112.9 μmol/h per one gram of the photocatalyst.

Example 2

Niobium hydrogenoxalate (1.45 g) ((Nb($HC_2O_4$)$_5$, having a content of 14.6% by weight in terms of $Nb_2O_5$, manufactured by Mitsuwa Chemical Co., Ltd.) was dissolved in water (100 g) to prepare an aqueous solution of niobium hydrogenoxalate having a content of 0.15% by weight in terms of niobium. Into the aqueous solution (100 g), the particulate titanium oxide (5 g) which had been obtained in the same manner as in Example 1 was added, and was stirred for 20 minutes under normal pressure at a normal temperature, to obtain a mixture of titanium oxide. While stirring and reducing pressure, the mixture was dried at 50° C. and then was calcined in air at 300° C. for one hour, to obtain a photocatalyst having an anatase-crystalline structure. The obtained photocatalyst had the titanium oxide on which niobium oxide was placed in the content of 3% by mol in terms of niobium, based on titanium in the titanium oxide. The photocatalyst had a BET specific surface area of 65 $m^2$/g.

Figure 4:
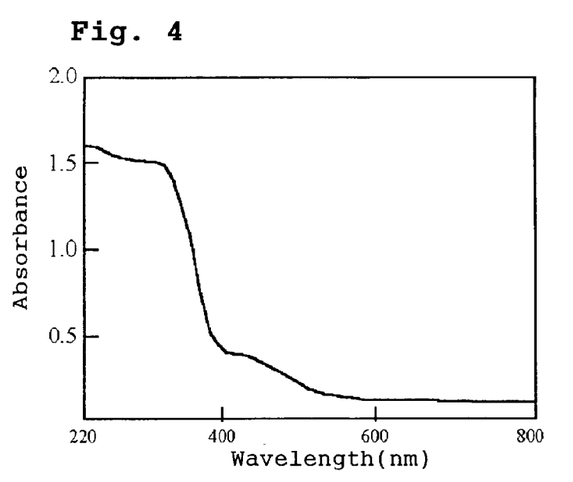

The ultraviolet-visible diffuse reflection spectrum of the photocatalyst was obtained and is shown in FIG. 4. In Table 1, are shown integrated value A of absorbance within a wavelength range of from 220 nm to 800 nm in the spectrum; integrated value B of absorbance within a wavelength range of from 400 nm to 800 nm in the spectrum; and index X.

Figure 5:
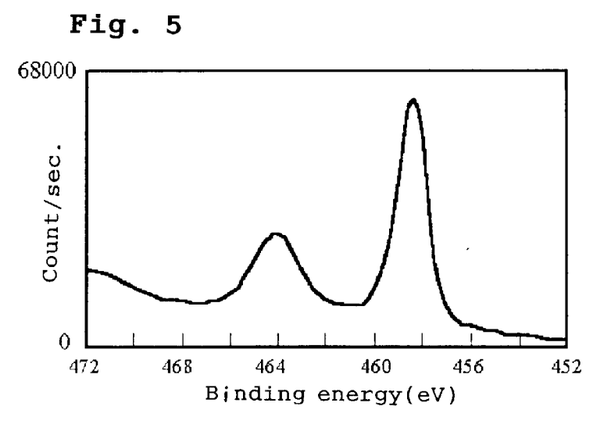
Figure 6:
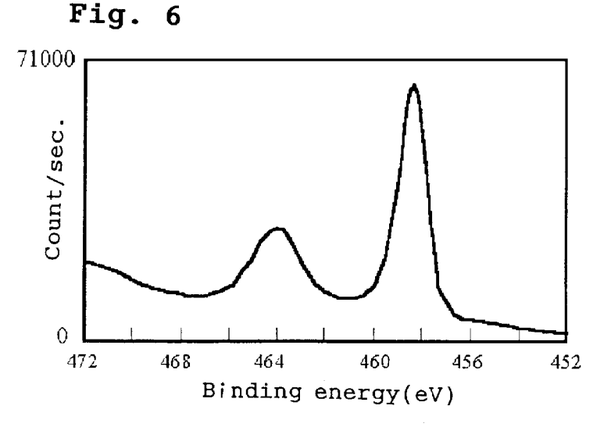

The XPS spectra of the photocatalyst was obtained (as described above in "(3) Index Y") and the second and forth XPS spectra are shown in FIG. 5 and FIG. 6, respectively. In Table 2, are shown half-widths, C and D, of peaks within a binding energy range of from 458 eV to 460 eV in the second and forth XPS spectra, respectively, and index Y.

The photocatalytic activity of the photocatalyst against acetaldehyde was evaluated. As a result, the producing rate of carbon dioxide was 74.8 μmol/h per one gram of the photocatalyst.

Example 3

The same processes as in Example 1 were carried out except that the aqueous solution of ammonium paratungstate was added in an amount of 58.69 g, rather than 17.6 g, to obtain a photocatalyst having an anatase-crystalline structure. The obtained photocatalyst had the titanium oxide on which tungsten oxide was placed in the content of 10% by mol in terms of tungsten, based on titanium in the titanium oxide. The obtained photocatalyst had a BET specific surface area of 65 $m^2$/g.

The ultraviolet-visible diffuse reflection spectrum of the photocatalyst was obtained. In Table 1, are shown integrated value A of absorbance within a wavelength range of from 220 nm to 800 nm in the spectrum; integrated value B of absorbance within a wavelength range of from 400 nm to 800 nm in the spectrum; and index X.

The photocatalytic activity of the photocatalyst against acetaldehyde was evaluated. As a result, the producing rate of carbon dioxide was 81.0 μmol/h per one gram of the photocatalyst.

Comparative Example 1

The same processes as in Example 1 were carried out except that, instead of using the particulate titanium oxide obtained in the manner disclosed in Example 1, a commercially available titanium oxide (3 g) (trade name: P-25, manufactured by DEGUSSA CORPORATION) was used, to obtain a photocatalyst. The photocatalyst had the titanium oxide on which tungsten oxide was placed in the content of 3% by mol in terms of tungsten, based on titanium in the titanium oxide. The photocatalyst had a BET specific surface area of 48 $m^2$/g.

Figure 7:
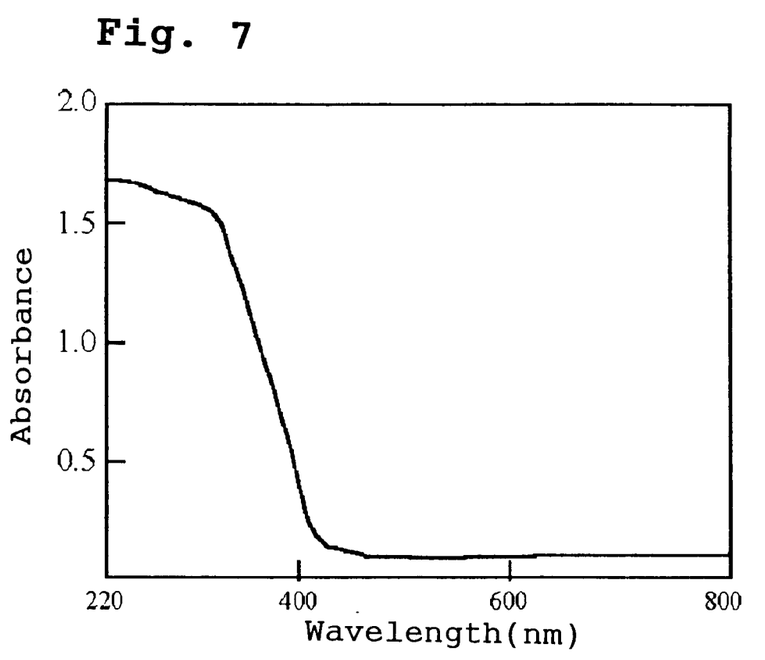
FIG. 7 is an ultraviolet-visible diffuse reflection spectrum of a photocatalyst which was obtained in Comparative Example 1.

The ultraviolet-visible diffuse reflection spectrum of the photocatalyst was obtained and is shown in FIG. 7. In Table 1, are shown integrated value A of absorbance within a wavelength range of from 220.nm to 800 nm in the spectrum; integrated value B of absorbance within a wavelength range of from 400 nm to 800 nm in the spectrum; and index X.

The photocatalytic activity of the photocatalyst against acetaldehyde was evaluated. As a result, the producing rate of carbon dioxide was 4.9 μmol/h per one gram of the photocatalyst.

TABLE 1

|  | Example 1 | Example 2 | Example 3 | Comparative Example 1 |
|---|---|---|---|---|
| Integrated value A | 305.8 | 311.3 | 333.5 | 294.7 |
| Integrated value B | 73.3 | 76.9 | 96.6 | 48.9 |
| Index X(=B/A) | 0.24 | 0.25 | 0.29 | 0.17 |

TABLE 2

|  | Example 1 | Example 2 |
|---|---|---|
| Half-width C (eV) | 1.42 | 1.44 |
| Half-width D (eV) | 1.29 | 1.33 |
| Index Y(=(C − D)/C) | 0.092 | 0.076 |

Example 4

Preparation of Titanium Oxide

A titanium oxysulfate (1515 g) (manufactured by Soekawa Chemical Co., Ltd.) was dissolved in water (6064 g) while stirring. Into the resulting solution, was added a 25% ammonia water (1694 g) (1st grade, manufactured by Wako Pure Chemical Industries, Ltd.) at an adding rate of 18 ml/min, while cooling with ice and stirring at 67 rpm, to conduct hydrolysis of titanium oxysulfate and obtain a slurry containing a titanium hydroxide. The amount of the utilized ammonia water was two times as much as the stoichiometric amount necessary to convert the titanium oxysulfate to the titanium hydroxide. The obtained slurry was filtered to collect the solid therein. The solid was washed with hot water, and was dried to obtain a powder. The powder was then calcined at 390° C. in air for one hour, followed by cooling to a room temperature. As a result, a particulate titanium oxide having an anatase-crystalline structure and having a water content of 15% by weight was obtained.

Coating with Metal-Containing Compound

Zinc nitrate hexahydrate (0.3 g) ($Zn(NO_3)_2 \cdot 6H_2O$, manufactured by Wako Pure Chemical Industries, Ltd.) was dissolved in water (100 g) to prepare an aqueous solution of zinc nitrate. Into the aqueous solution, the above-obtained particulate titanium oxide (3.2 g) having an anatase-crystalline structure was added, and was stirred for 20 minutes under normal pressure at a normal temperature, to obtain a mixture of titanium oxide. While stirring and reducing pressure, the mixture was dried at 55° C. and then was calcined in air at 300° C. for one hour, to obtain a photocatalyst having an anatase-crystalline structure. The obtained photocatalyst had the titanium oxide on which zinc oxide was placed in the content of 3% by mol in terms of zinc, based on titanium in the titanium oxide.

Figure 8:
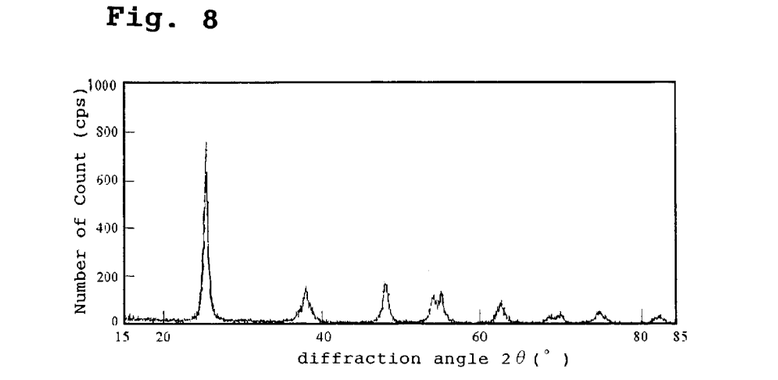
FIGS. 8 and 9 are X-ray diffraction spectra of a photocatalyst of the present invention, which are obtained in Example 4.
Figure 9:
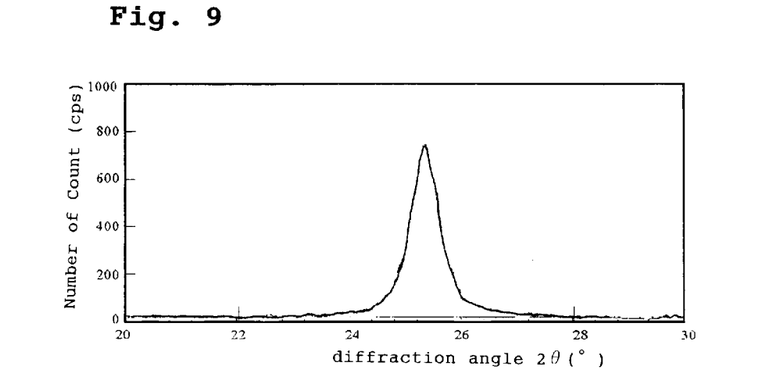

The XRD spectrum of the photocatalyst was obtained and in shown in FIG. 8. The enlarged XRD spectrum thereof around the peak corresponding to (101) plate of the photocatalyst 5 is also shown in FIG. 9. In Table 3, are shown diffraction angle 2 θ and half-width β of the peak; and anatase-crystalline size L.

Figure 10:
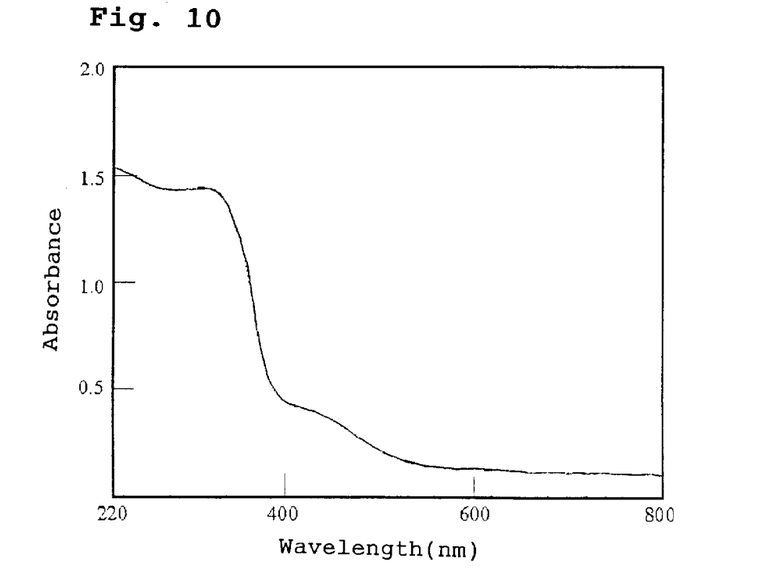

The ultraviolet-visible diffuse reflection spectrum of the photocatalyst was also obtained and is shown in FIG. 10. In Table 4, are shown integrated value A of absorbance within a wavelength range of from 220 nm to 800 nm in the spectrum; integrated value B of absorbance within a wavelength range of from 400 nm to 800 nm in the spectrum; and index X.

The BET specific surface area E, adsorption amount F of carbon dioxide and index Z of the photocatalyst were obtained and are shown in Table 5, respectively.

The photocatalytic activity of the photocatalyst against acetic acid was evaluated. As a result, the producing rate of carbon dioxide was 5.97 μmol/h per one gram of the photocatalyst.

Example 5

Cerium nitrate hexahydrate (0.42 g) ($Ce(NO_3)_3 \cdot 6H_2O$, manufactured by Wako Pure Chemical Industries, Ltd.) was dissolved in water (100 g) to prepare an aqueous solution of cerium nitrate. Into the aqueous solution (100 g), the particulate titanium oxide (3.0 g) which had been obtained in the same manner as in Example 4 was added, and was stirred for 20 minutes under normal pressure at a normal temperature, to obtain a mixture of titanium oxide. While stirring and reducing pressure, the mixture was dried at 55° C. and then was calcined in air at 300° C. for one hour, to obtain a photocatalyst having an anatase-crystalline structure. The obtained photocatalyst had the titanium oxide on which cerium oxide was placed in the content of 3% by mol in terms of cerium, based on titanium in the titanium oxide.

Figure 11:
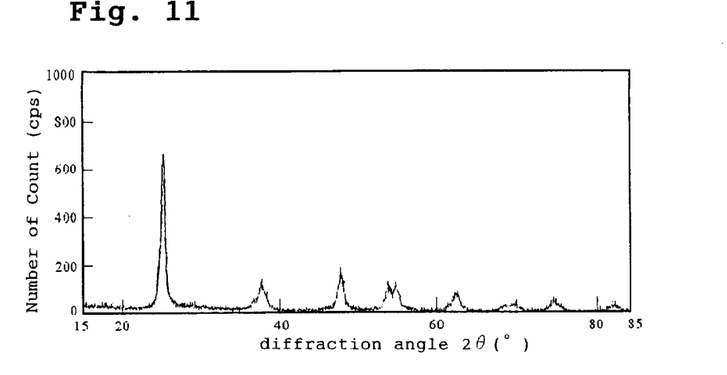
FIGS. 11 and 12 are X-ray diffraction spectra of a photocatalyst of the present invention, which are obtained in Example 5.
Figure 12:
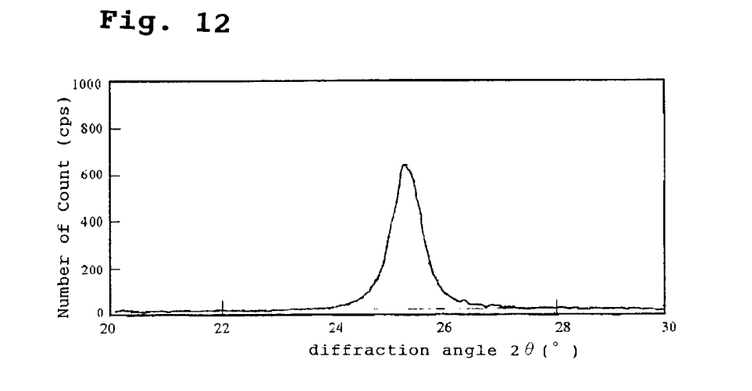

The XRD spectrum of the photocatalyst was obtained and in shown in FIG. 11. The enlarged XRD spectrum thereof around the peak corresponding to (101) plate of the photocatalyst is also shown in FIG. 12. In Table 3, are shown diffraction angle 2 θ and half-width β of the peak; and anatase-crystalline size L.

Figure 13:
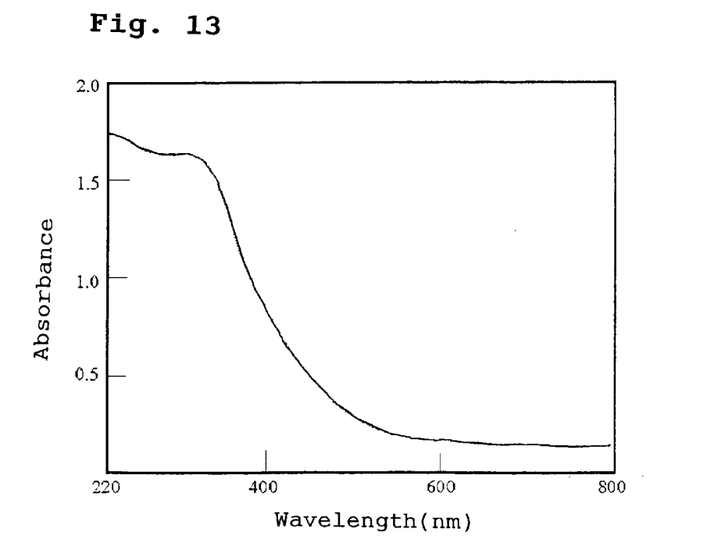

The ultraviolet-visible diffuse reflection spectrum of the photocatalyst was also obtained and is shown in FIG. 13. In Table 4, are shown integrated value A of absorbance within a wavelength range of from 220 nm to 800 nm in the spectrum; integrated value B of absorbance within a wavelength range of from 400 nm to 800 nm in the spectrum; and index X.

The BET specific surface area E, adsorption amount F of carbon dioxide and index Z of the obtained photocatalyst were obtained and are shown in Table 5, respectively.

The photocatalytic activity of the photocatalyst against acetic acid was evaluated. As a result, the producing rate of carbon dioxide was 2.63 μmol/h per one gram of the photocatalyst.

Comparative Example 2

The same processes as in Example 4 were carried out except that, instead of using the particulate titanium oxide obtained in Example 4, a commercially available titanium oxide (3.2 g) (trade name: ST-01, manufactured by Ishihara Sangyo Kaisha, Ltd.) was used, to obtain a photocatalyst. The photocatalyst had the titanium oxide on which zinc oxide was placed in the content of 3% by mol in terms of zinc, based on titanium in the titanium oxide.

Figure 14:
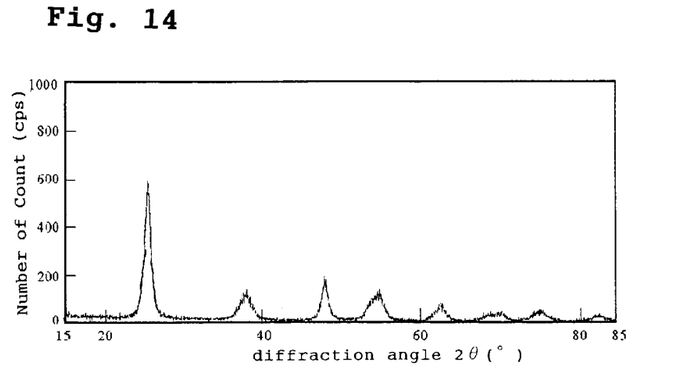
FIGS. 14 and 15 are X-ray diffraction spectra of a photocatalyst, which are obtained in Comparative Example 2.
Figure 15:
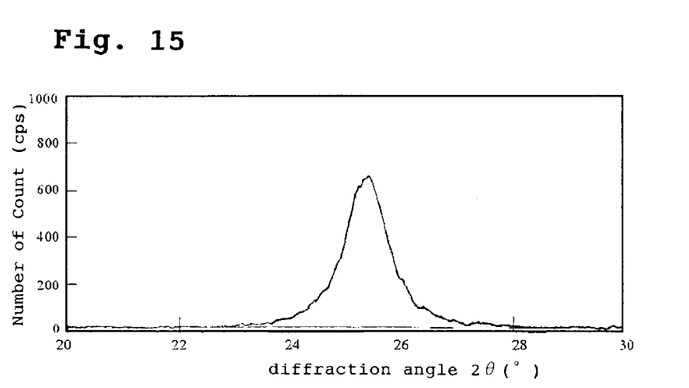

The XRD spectrum of the photocatalyst was obtained and in shown in FIG. 14. The enlarged XRD spectrum thereof around the peak corresponding to (101) plate of the photocatalyst is also shown in FIG. 15. In Table 3, are shown diffraction angle 2 θ and half-width β of the peak; and anatase-crystalline size L.

Figure 16:
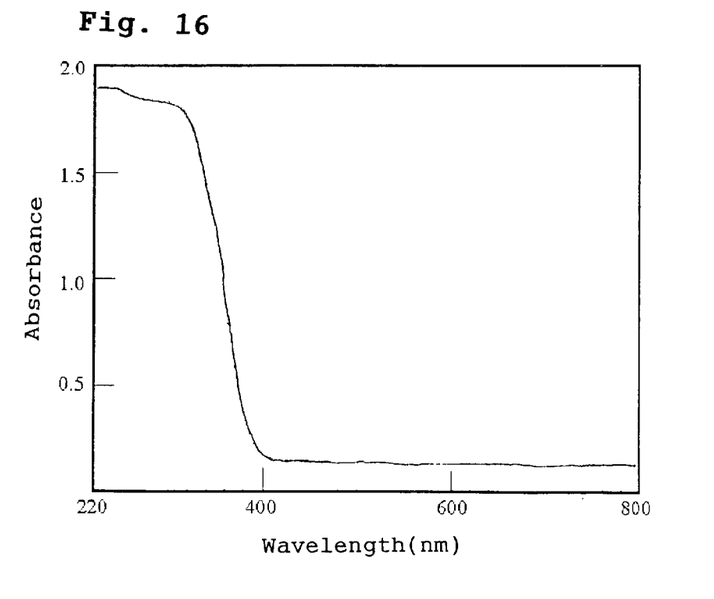
FIGS. 16 and 19 are ultraviolet-visible diffuse reflection spectra of photocatalysts, which are obtained in Comparative Examples 2 and 3, respectively.

The ultraviolet-visible diffuse reflection spectrum of the photocatalyst was also obtained and is shown in FIG. 16. In Table 4, are shown integrated value A of absorbance within a wavelength range of from 220 nm to 800 nm in the spectrum; integrated value B of absorbance within a wavelength range of from 400 nm to 800 nm in the spectrum; and index X.

The BET specific surface area E, adsorption amount F of carbon dioxide and index Z of the obtained photocatalyst were obtained and are shown in Table 5, respectively.

The photocatalytic activity of the photocatalyst against acetic acid was evaluated. As a result, the producing rate of carbon dioxide was 1.57 μmol/h per one gram of the photocatalyst.

Comparative Example 3

The same processes as in Example 5 were carried out except that, instead of using the particulate titanium oxide obtained in Example 5, a commercially available titanium oxide (3.0 g) (trade name: ST-01, manufactured by Ishihara Sangyo Kaisha, Ltd.) was used, to obtain a photocatalyst. The photocatalyst had the titanium oxide on which cerium oxide was placed in the content of 3% by mol in terms of cerium, based on titanium in the titanium oxide.

Figure 17:
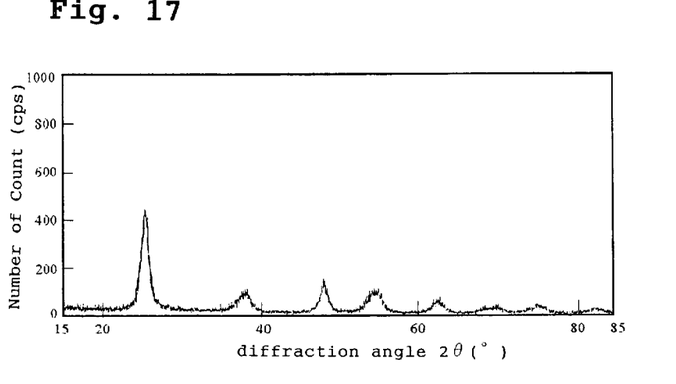
FIGS. 17 and 18 are X-ray diffraction spectra of a photocatalyst, which are obtained in Comparative Example 3.
Figure 18:
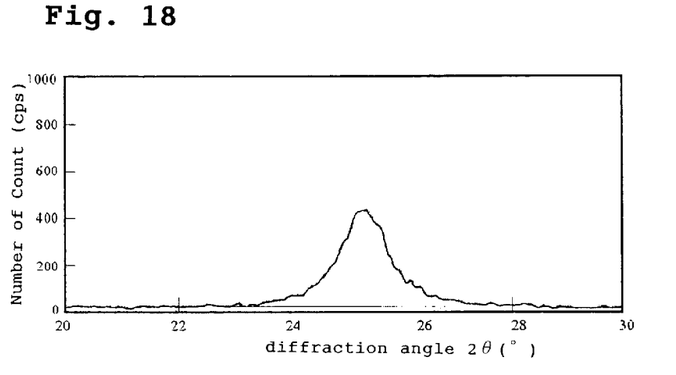

The XRD spectrum of the photocatalyst was obtained and in shown in FIG. 17. The enlarged XRD spectrum thereof around the peak corresponding to (101) plate of the photocatalyst is also shown in FIG. 18. In Table 3, are shown diffraction angle 2 θ and half-width β of the peak; and anatase-crystalline size L.

Figure 19:
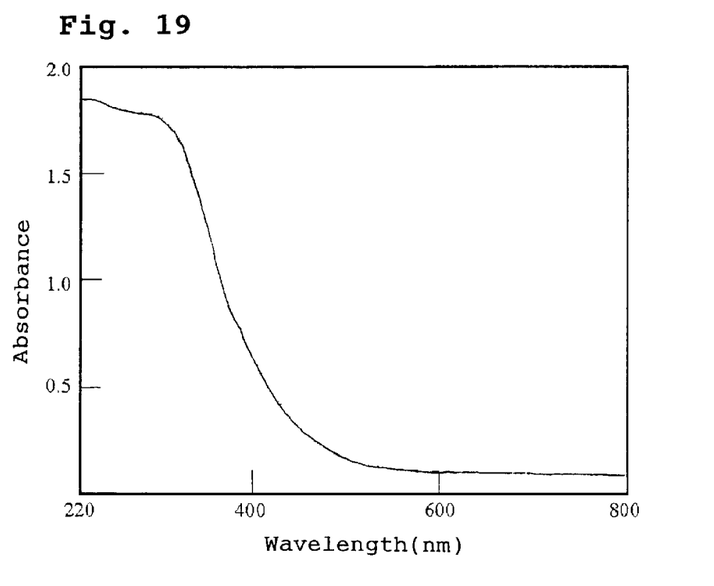

The ultraviolet-visible diffuse reflection spectrum of the photocatalyst was also obtained and is shown in FIG. 19. In Table 4, are shown integrated value A of absorbance within a wavelength range of from 220 nm to 800 nm in the spectrum; integrated value B of absorbance within a wavelength range of from 400 nm to 800 nm in the spectrum; and index X.

The BET specific surface area E, adsorption amount F of carbon dioxide and index Z of the obtained photocatalyst were obtained and are shown in Table 5, respectively.

The photocatalytic activity of the photocatalyst against acetic acid was evaluated. As a result, the producing rate of carbon dioxide was 0.68 μmol/h per one gram of the photocatalyst.

TABLE 3

|  | Example 4 | Example 5 | Comparative Example 2 | Comparative Example 3 |
|---|---|---|---|---|
| diffraction angle 2θ | 25.336° (0.4422 radian) | 25.332° (0.4421 radian) | 25.370° (0.4428 radian) | 25.384° (0.4430 radian) |
| half-width β | 0.594° (0.0104 radian) | 0.648° (0.0113 radian) | 0.881° (0.0154 radian) | 1.013° (0.0177 radian) |
| anatase-crystalline size L (=0.94 × 0.15406/(β × cos θ) | 14.3 | 13.1 | 9.6 | 8.4 |

TABLE 4

|  | Example 4 | Example 5 | Comparative Example 2 | Comparative Example 3 |
|---|---|---|---|---|
| Integrated value A | 296.4 | 330.7 | 295.1 | 340.4 |
| Integrated value B | 71.5 | 89.4 | 45.9 | 67.3 |
| Index X(=B/A) | 0.24 | 0.27 | 0.16 | 0.20 |

TABLE 5

|  | Example 4 | Example 5 | Comparative Example 2 | Comparative Example 3 |
|---|---|---|---|---|
| BET specific surface area E (m$^2$/g) | 71.2 | 66.7 | 184.1 | 180.9 |
| Adsorption amount F (μmol/g) of carbon dioxide | 74.6 | 58.0 | 126.5 | 129.0 |
| Index Z(=F/E) | 1.05 | 0.87 | 0.69 | 0.71 |

What is claimed is:

1. A photocatalyst comprising a titanium oxide and a metal-containing compound other than titanium oxide on the surface of the titanium oxide, wherein the metal-containing compound is a metal oxide having an acid site and the photocatalyst has a BET specific surface area of about 55 m$^2$/g or larger, or wherein the metal-containing compound is a basic metal-containing compound and the photocatalyst has an anatase-crystalline structure and an anatase-crystalline size of about 10 nm or larger; and wherein the photocatalyst has index X of about 0.2 or more, index X being calculated by equation (I):

$$X = B/A \qquad (I)$$

wherein A represents an integrated value of absorbance within a wavelength range of from 220 nm to 800 nm along an ultraviolet-visible diffuse reflection spectrum of the photocatalyst, and B represents an integrated value of absorbance within a wavelength range of from 400 nm to 800 nm along the ultraviolet-visible diffuse reflection spectrum.

2. The photocatalyst according to claim 1, wherein the photocatalyst contains the metal-containing compound in an amount of about 0.05% by mol in terms of the metal element of the compound, based on titanium in the photocatalyst.

3. The photocatalyst according to claim 1, wherein the metal-containing compound is a metal oxide having an acid site and the photocatalyst has a BET specific surface area of about 55 m$^2$/g or larger.

4. The photocatalyst according to claim 3, wherein the photocatalyst has a BET specific surface area of about 300 m$^2$/g or smaller.

5. The photocatalyst according to claim 3 or 4, wherein the photocatalyst has index Y of about 0.05 or more, index Y being calculated by equation (II):

$$Y = (C-D)/C \qquad (II)$$

wherein C and D represent half-widths of peaks within the range of binding energy of from 458 eV to 460 eV in the second and forth X-ray photoelectron spectra, respectively, the spectra being the second and fourth spectra among the four-time measurements of X-ray photoelectron spectrum showing an electric state of titanium of the photocatalyst in irradiating with X-rays.

6. The photocatalyst according to claim 1, wherein the metal-containing compound is a basic metal-containing compound and the photocatalyst has an anatase-crystalline structure and an anatase-crystalline size of about 10 nm or larger.

7. The photocatalyst according to claim 6, wherein the basic metal-containing compound is at least one member selected from the group consisting of oxides, hydrides and carbonates, of alkali metal, alkaline-earth metal, rare earth element or zinc.

8. The photocatalyst according to claim 6 or 7, wherein the photocatalyst has index Z of about 0.8 and more, which is calculated by equation (III):

$$Z = F/E \qquad (III)$$

wherein E represents a BET specific surface area (m$^2$/g) of the photocatalyst and F represents a CO$_2$ adsorption amount (μmol/g) of the photocatalyst.

9. A process for producing the photocatalyst as claimed in claims 1 or 2, which comprises the steps of allowing a titanium oxide to come in contact with a solution or slurry of a metal-containing compound other than titanium oxide and/or a solution or slurry of a compound which makes the metal-containing compound by heating; and heating the resulting titanium oxide, to obtain a photocatalyst.

10. The process for producing a photocatalyst according to claim 9, wherein the titanium oxide has an anatase-crystalline structure.

11. The process for producing a photocatalyst according to claim 9, wherein the titanium oxide is obtained by a process comprising the steps of reacting a titanium compound with a base to obtain a reaction product at a temperature of about 60° C. or lower; and calcining the reaction product to obtain a titanium oxide.

12. The process for producing a photocatalyst according to claim 9, wherein the titanium oxide is obtained by a process comprising the steps of calcining titanium oxysulfate in the presence of oxygen.

13. The process for producing a photocatalyst according to claim 12, wherein the titanium oxide is obtained by a process comprising the steps of calcining titanium oxysulfate in the presence of oxygen.

14. A process for producing the photocatalyst as claimed claims 1 or 2, which comprises the steps of putting in a sealed-container, a titanium oxide and at least one compound selected from the group consisting of metal-containing compound and a compound which makes the metal-containing compound by heating; heating and evaporating the compound; and allowing the compound to adhere to the surface of the titanium oxide, to obtain a photocatalyst.

15. The process for producing a photocatalyst according to claim 14, wherein the titanium oxide has an anatase-crystalline structure.

16. The process for producing a photocatalyst according to claim 14, wherein the titanium oxide is obtained by a process comprising the steps of reacting a titanium compound with a base to obtain a reaction product at a temperature of about 60° C. or lower; and calcining the reaction product to obtain a titanium oxide.

17. The process for producing a photocatalyst according to claim 14, wherein the titanium oxide is obtained by a process comprising the steps of calcining titanium oxysulfate in the presence of oxygen.

18. A process for producing the photocatalyst as claimed in claims 1 or 2, which comprises the steps of placing a metal-containing compound on a titanium oxide, and treating the resulting titanium oxide having the metal-containing compound thereon with steam or carbon dioxide gas, to obtain a photocatalyst.

19. The process for producing a photocatalyst according to claim 18, wherein the titanium oxide has an anatase-crystalline structure.

20. The process for producing a photocatalyst according to claim 18, wherein the titanium oxide is obtained by a process comprising the steps of reacting a titanium compound with a base to obtain a reaction product at a temperature of about 60° C. or lower; and calcining the reaction product to obtain a titanium oxide.

21. A photocatalyst coating composition comprising the photocatalyst as claimed in claims 1 or 2, and a solvent.

22. A process for producing the photocatalyst as claimed in claim 1, which comprises the steps of allowing a titanium oxide to come in contact with a solution or slurry of a metal-containing compound other than titanium oxide and/ or a solution or slurry of a compound which makes the metal-containing compound by heating; and heating the resulting titanium oxide, to obtain a photocatalyst.

23. The process for producing a photocatalyst according to claim 22, wherein the titanium oxide has an anatase-crystalline structure.

24. The process for producing a photocatalyst according to claim 22, wherein the titanium oxide is obtained by a process comprising the steps of reacting a titanium compound with a base to obtain a reaction product at a temperature of about 60° C. or lower; and calcining the reaction product to obtain a titanium oxide.

25. The process for producing a photocatalyst according to claim 22, wherein the titanium oxide is obtained by a process comprising the steps of calcining titanium oxysulfate in the presence of oxygen.

26. A process for producing the photocatalyst as claimed in claim 1, which comprises the steps of putting in a sealed-container, a titanium oxide and at least one compound selected from the group consisting of metal-containing compound and a compound which makes the metal-containing compound by heating; heating and evaporating the compound; and allowing the compound to adhere to the surface of the titanium oxide, to obtain a photocatalyst.

27. The process for producing a photocatalyst according to claim 26, wherein the titanium oxide has an anatase-crystalline structure.

28. The process for producing a photocatalyst according to claim 26, wherein the titanium oxide is obtained by a process comprising the steps of reacting a titanium compound with a base to obtain a reaction product at a temperature of about 60° C. or lower; and calcining the reaction product to obtain a titanium oxide.

29. The process for producing a photocatalyst according to claim 26, wherein the titanium oxide is obtained by a process comprising the steps of calcining titanium oxysulfate in the presence of oxygen.

30. A process for producing the photocatalyst as claimed in claim 1, which comprises the steps of placing a metal-containing compound on a titanium oxide, and treating the resulting titanium oxide having the metal-containing compound thereon with steam or carbon dioxide gas, to obtain a photocatalyst.

31. The process for producing a photocatalyst according to claim 30, wherein the titanium oxide has an anatase-crystalline structure.

32. The process for producing a photocatalyst according to claim 30, wherein the titanium oxide is obtained by a process comprising the steps of reacting a titanium compound with a base to obtain a reaction product at a temperature of about 60° C. or lower; and calcining the reaction product to obtain a titanium oxide.

33. The process for producing a photocatalyst according to claim 30, wherein the titanium oxide is obtained by a process comprising the steps of calcining titanium oxysulfate in the presence of oxygen.

34. A photocatalyst coating composition comprising the photocatalyst as claimed in claim 1 and a solvent.

* * * * *